United States Patent
Ingram et al.

(10) Patent No.: US 6,758,518 B2
(45) Date of Patent: *Jul. 6, 2004

(54) VEHICLE SEAT

(75) Inventors: Michael Peter Ingram, Isle of Man (GB); Jeremy Robert Goddin, Maldon (GB)

(73) Assignee: MHM Holdings Limited, Nassau (BS)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/076,972

(22) Filed: May 13, 1998

(65) Prior Publication Data

US 2002/0043826 A1 Apr. 18, 2002

(30) Foreign Application Priority Data

Aug. 9, 1997 (GB) .............................................. 9716964

(51) Int. Cl.[7] .............................................. A47B 39/00
(52) U.S. Cl. ................. 297/146; 297/163; 297/DIG. 5; 108/44
(58) Field of Search ................................ 297/146, 163, 297/188.04, DIG. 5; 108/90, 44, 25; 150/157; 428/920

(56) References Cited

U.S. PATENT DOCUMENTS

| | | | |
|---|---|---|---|
| 1,361,299 A | | 12/1920 | Baseman |
| 1,942,287 A | * | 1/1934 | Heitz ........................ 108/90 X |
| 2,039,922 A | | 5/1936 | Neats et al. |
| D123,902 S | | 12/1940 | Caldwell |
| D136,052 S | * | 7/1943 | Setton |
| D142,447 S | * | 9/1945 | Stein ........................... D6/620 |
| D143,667 S | * | 1/1946 | Marron ........................ D6/619 |
| D153,531 S | * | 4/1949 | Leister et al. ................ D2/504 |

(List continued on next page.)

FOREIGN PATENT DOCUMENTS

| | | | | |
|---|---|---|---|---|
| CH | 150 151 | | 12/1931 | |
| DE | 93 13 024 U1 | | 1/1994 | |
| DE | 93 13 024 | | 1/1994 | |
| EP | 0112170 | * | 6/1984 | ................ 297/163 |
| FR | 2 247 054 A | | 5/1975 | |
| FR | 2247054 | * | 5/1975 | ................ 108/90 |
| FR | 2 469 766 | | 5/1981 | |
| GB | 1600744 | | 5/1977 | |
| GB | 1 600 744 | | 10/1981 | |
| GB | 2311887 | | 10/1997 | |
| GB | 2 311 887 | | 10/1997 | |
| GB | 2 311 887 A | | 10/1997 | |
| SE | 150 151 A | | 10/1931 | |
| WO | WO 90/07025 | * | 6/1990 | ............ 248/688 X |
| WO | WO 95/14588 | | 6/1995 | |

OTHER PUBLICATIONS

Fremont Mutual Insurance Co., Basement, Utility Room and Workshop Safety, p. 1.*
United States Code of Federal Regulations, Part 14, Section 23.853 with 14 CFR Part 5 Appendix F.
Declaration of Dennis Corder, Feb. 24, 2003, with Exhibits A–H.
Declaration of Frank Scalise, Feb. 24, 2003, with Exhibits A–B.

Primary Examiner—Peter M. Cuomo
Assistant Examiner—Stephen Vu
(74) Attorney, Agent, or Firm—Birch, Stewart, Kolasch & Birch, LLP

(57) ABSTRACT

A vehicle seat has a mechanism supporting a table for articulation between a stowed position and an extended position. A surface of the table extends generally horizontally from an integral part of the seat, a cover overlies the table surface, and the cover is detachably secured to the table in a manner that will allow the table to be moved to the stowed position and back to the extended position without damaging the cover.

31 Claims, 3 Drawing Sheets

U.S. PATENT DOCUMENTS

| | | | |
|---|---|---|---|
| 2,905,270 A | | 9/1959 | Pavol |
| 2,905,370 A | | 9/1959 | Pavol |
| 3,049,374 A | * | 8/1962 | Nance .......................... 297/146 |
| 3,458,216 A | | 7/1969 | Harrison |
| 3,899,982 A | | 8/1975 | Fetzek |
| 3,985,374 A | | 10/1976 | Powaska |
| 4,015,297 A | * | 4/1977 | Christian .......................... 5/97 |
| 4,095,533 A | * | 6/1978 | Leveille ......................... 108/90 |
| 4,121,856 A | | 10/1978 | Brunette |
| 4,159,071 A | | 6/1979 | Roca |
| D255,081 S | | 5/1980 | Ramorini |
| 4,321,045 A | * | 3/1982 | Crowley ..................... 434/129 |
| 4,450,761 A | | 5/1984 | Bailey |
| 4,457,964 A | | 7/1984 | Kaminstein |
| 4,484,529 A | | 11/1984 | Caldares |
| 4,511,178 A | * | 4/1985 | Brennan ................. 297/163 X |
| 4,726,621 A | * | 2/1988 | Muller ....................... 297/146 |
| D308,461 S | | 6/1990 | Hosea |
| D308,497 S | | 6/1990 | Roche |
| 5,010,668 A | | 4/1991 | Zeligson |
| 5,082,116 A | | 1/1992 | Schanne |
| 5,084,321 A | | 1/1992 | Sui |
| 5,161,826 A | | 11/1992 | Van Giesen et al. |
| 5,201,837 A | | 4/1993 | Lagontaine |
| 5,219,219 A | | 6/1993 | Virden, Jr. |
| D353,123 S | | 12/1994 | Korona |
| 5,413,302 A | | 5/1995 | Ferster |
| 5,476,701 A | | 12/1995 | Berger |
| D365,912 S | * | 1/1996 | Fulcher et al. ............... D2/624 |
| 5,542,359 A | | 8/1996 | Polries |
| 5,588,663 A | * | 12/1996 | Rundle et al. ...... 297/188.18 X |
| 5,609,933 A | * | 3/1997 | Stepanek ................. 108/90 X |
| 5,918,550 A | | 7/1999 | Weir et al. |
| D417,999 S | | 12/1999 | Ingram |
| D464,840 S | | 10/2002 | Ingram |

* cited by examiner

VEHICLE SEAT

FIELD OF THE INVENTION

The present invention relates to the provision of enhanced facilities to passengers using vehicle seats. In particular, the invention concerns an advantageous vehicle seat having an articulated table and a cover therefore.

BACKGROUND OF THE INVENTION

This invention is concerned with a vehicle seat of the type that supports a table for articulation between a stowed position and an extended position in which a surface of the table projects generally horizontally from an integral part of the seat. This type of seat is commonly used in passenger aircraft but can also be used in other vehicles such as, for example, coaches, buses, hovercraft, trains and ships. The primary objective of such vehicle seats is to provide a table surface which can either be stowed away to give the passenger optimum space whilst seated, or can be swiftly articulated to position the table surface immediately in front of the seated passenger. Such tables are typically used to support food trays and drinks and to serve generally as a desk. They are usually moved between their stowed and extended position several times during a journey. Examples of vehicle seats which support a table for articulation between a stowed position and an extended position in which a surface of the table projects generally horizontally from an integral part of the seat are taught, for example, by U.S. Pat. Nos. 3,985,374, 4,159,071, 5,082,116 and by UK Patent 1,600,744.

Various mechanisms are well-known for attaching such tables to the associated vehicle seat and these do not form part of the present invention. However many of such attachments fall into the following two categories.

In the first category the table is supported by the mechanism from the seat back immediately in front of the passenger such that, when in the extended position, the table surface will extend backwards from the seat back (that is rearwards over the passenger's legs), a first edge of the table being directed towards the rear of the seat back in front of the passenger, and a second edge of the table, parallely spaced from to the first edge, being directed away from the rear of the seat back towards the passenger. When the table is stowed into the rear of the seat back and is consequently no longer horizontal, the support mechanism tilts the table until its surface is flush with the rear of the seat back. This tilting movement results in the second edge being positioned generally above the first edge, and any item left on the table surface will be tipped forward into the gap between the table surface and the rear of the seat back in front of the passenger.

In the second category the table is supported by the mechanism from an arm of the seat occupied by the passenger such that, when in the extended position, the table surface will project away from the seat arm (that is laterally across the passenger's legs), a first edge of the table being positioned adjacent the seat arm and a second edge of the table, parallely-spaced from the first edge, being directed away from the seat arm. When the table is stowed into the seat arm, the support mechanism tilts the table until the second edge is positioned generally adjacent the seat arm. Any item left on the table surface will be tipped sideways either over the adjacent passenger or aisle, or into the cavity for receiving the stowed table. Tables of this second category are frequently formed as two substantially equal leaves interconnected by a hinge having an axis parallely-spaced between the first and second edges. When the table is stowed, the two leaves are folded together prior to insertion into the cavity in the seat arm. With this arrangement, any item left on the table surface will be crushed between the table leaves.

SUMMARY OF THE INVENTION

According to the present invention a vehicle seat has a mechanism supporting a table for articulation between a stowed position and an extended position in which a surface of the table extends generally horizontally from an integral part of the seat, a cover overlies the table surface, and the cover is detachably secured to the table in a manner that will allow the table to be moved to the stowed position and back to the extended position without damaging the cover. Hitherto, covers have not been used on such tables because they would slide about on the table surface when extended, and would need to be removed every time the table was stowed away. The present invention therefore enables a cover to be temporarily fixed to the table in a manner that ensures the cover will remain in place throughout the journey, irrespective of the movement of the table between its extended and stowed positions. At the end of the journey the cover can also be simply replaced if it is soiled or needs to be replaced with a different cover. By enabling a detachable cover to be fixed to this kind of table, a substantial new range of services can be made available to the passenger, and a new range of promotional options are available to the vehicle operator.

The manner in which the cover is detachably secured to the table, to permit movement between its stowed and extended positions without damaging the cover, depends on the way the table articulates between its stowed and articulated positions.

In the case where the table is supported by the mechanism from the seat back such that, in the extended position the table surface will project backwards from the rear of the seat back with a first edge directed towards the rear of the seat back and with a second edge parallely-spaced from the first edge directed away from the rear of the seat back, and in the stowed position the second edge will be positioned generally above the first edge, the cover should be detachably secured to the table adjacent the second edge. In this manner, when the table is moved to its stowed position, the cover will be suspended by its attachment to the second edge and will remain in position relative to the table surface until the table is returned to its extended position. Attaching the cover to the table adjacent the second edge also serves to protect the edge of the cover immediately adjacent the passenger from being rubbed off the table by contact with the passenger's body.

On the other hand, in the case where the table is supported by the mechanism from an arm of the seat such that, in the extended position the table surface will project laterally away from the seat arm with a first edge positioned adjacent the seat arm and with a second edge parallely-spaced from to the first edge and directed away from the seat arm, and in the stowed position the second edge will be positioned generally adjacent the seat arm, the cover should be detachably secured to the table adjacent the second edge. In this manner the cover will again be suspended from the second edge as the table is tilted sideways towards its stowed position. There is also a third edge of the table surface orientated at right angles to both the first and second edges and directed towards the front of the seat back; that is towards the passenger. In the stowed position this third edge will be positioned generally within the seat arm. The cover may also be detachably secured to the table adjacent this third edge to ensure that it will not catch on the seat arm as the table is moved towards its stowed position. Tables that are stowed in a seat arm are often constructed from two leaves which are hinged for folding about an axis parallely-spaced between the first and second axes. With such tables the cover will essentially be folded between the leaves as it is moved to the stowed position. In such cases it may be desirable either to split the cover into two parts. One for each leaf, or to provide extra areas of attachment to ensure that the cover will be unfolded to be substantially flat when the table is next extended.

The cover is preferably detachably secured to the table by a releasable adhesive carried by the cover. Such adhesive is preferably positioned adjacent an edge of the cover that will be adjacent the appropriate edge of the table. The adhesive is preferably arranged as a strip extending substantially across the underside of the cover, but may instead be arranged as a series of discrete areas. The adhesive may also be carried by such other areas of the cover as may be appropriate to keep the cover undamaged as the table is stowed, and to ensure that the cover is correctly positioned over the table as it is extended. These areas of adhesive would desirably be applied to the cover during its manufacture and be protected by a pull-off strip that would be removed immediately prior to the cover being mounted on its table. The covers may be manufactured as pads with each cover serving as the pull-off strip for the adjacent cover in the pad.

Alternatively the cover may be detachably secured to the table by a releasable clip means carried by the table. This clip means is preferably arranged adjacent the second edge of the table, but may be arranged adjacent one or more other edges of the table. The clip means can be of any convenient construction but is preferably made as part of the table edge. It may include a strip that is carried by the table and extends substantially across the table next to its second edge, the strip being arranged so that the appropriate edge of the cover will be trapped between the strip and the table. For instance, an aperture for the insertion of an edge of the cover could be defined between the strip and the surface of the table, the strip being biased towards the table surface to grip the edge of an inserted cover.

In the case where the table defines a depression for locating a drinking vessel, the cover can be formed to permit such use of the depression despite the fitting of the cover. This is achieved by shaping the cover to allow a drinking vessel to be located by the depression. This may be achieved, for instance, by forming the cover with an aperture that will overlie the depression when the cover is correctly aligned with the table. This aperture may be formed by a press-out portion of the cover, and this press-out portion may then be detachably secured in the depression. Alternatively, the cover may be formed with a portion that is distorted into the depression; for instance the distorted portion may be connected to the cover by an array of integral spiral strips. Alternatively, the cover may be formed, for instance by moulding or pressing, to have a portion that fits into the depression, The latter arrangement may also be used to ensure correct alignment of the cover with the table surface.

Each cover is an essential element of the invention and comprises a sheet of material having a profile suitable for the size and shape of the table, an upper face that will be visible when the table is in its extended position, and a lower face that will be supported by the table surface when the table is in its extended position. The covers are very preferably made from a material that is fire-retardant or fire-proof, or from a laminated sheet having such properties. This lamination may include a photograph which extends over the upper face and is protected by with a transparent sealing layer which preferably provides a non-slip surface. The covers may be supplied singly, or in pads with successive covers being temporarily secured face-to-face by the adhesive areas that will be used to secure each of them to its table surface.

The provision of readily removable covers for such table tops opens a wide range of options attractive both to the passenger and to the vehicle operator.

Insofar as the passenger is concerned, the cover will define a clean surface to his table, can enhance fire protection, and can bear printed matter of interest to him. For instance, it could be an in-flight programme, a crossword or other puzzle, information about his destination or other reading matter.

Insofar as the operator is concerned, the cover will enable the decor of the table to be changed rapidly and will simplify the cleaning of the tables between flights. The covers also open up the possibility of customising each seat for each journey. This could be at the level of identifying those seats booked through a particular tour operator thereby helping to identify those seats reserved for a group of travellers whilst providing publicity for the tour operator and the potential of providing information about the destination or local services. It could even be at a personal level identifying the passenger for whom the seat has been reserved and including appropriate personal messages or information.

The covers could also be formed as pads each comprising a set of covers interconnected along a common edge. In this manner the entire pad would be detachably secured to the table so that the passenger can view any of the cover sheets. Such sheets could include the passenger safety details and a variety of topics to distract or entertain the passenger during the journey.

Any of the covers could also bear information by way of advertisement or sponsorship and in this form could raise extra revenue to the vehicle operator or tour operator, or a discount to passengers.

DETAILED DESCRIPTION OF THE INVENTION

Figure 1:
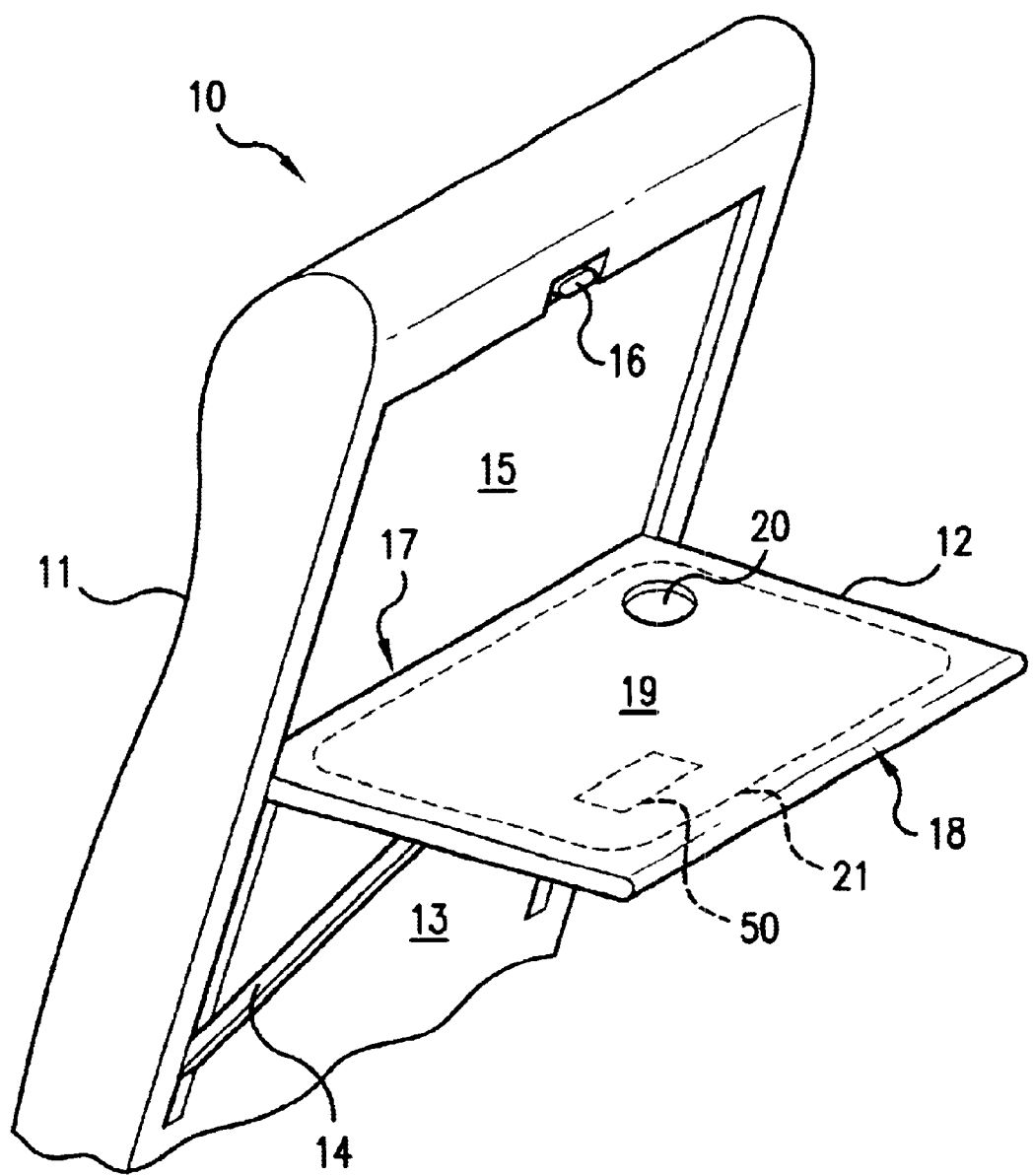
FIG. 1 is an isometric view of part of a vehicle seat showing a table in its extended position.

With reference to FIG. 1, a vehicle seat 10 includes a seat back 11 supported from the vehicle floor by unshown frames and an unshown seat squab. A table 12 is supported from the rear 13 of the seat back by a mechanism 14 which permits the table 12 to be moved, by a passenger seated behind the table 12, from the extended position illustrated, to a stowed position in which the table 12 fits flushly within a recess 15 and is retained in position by a toggle 16. In the extended position illustrated, the table extends backwardly to cover the legs of the passenger using the table, a first edge 17 of the table 12 being directed towards the rear 13 of the seat back 11 in front of this passenger, and a second edge 18 of the table 12, parallel to the first edge 17, being directed away from the rear 13 of the seat back 12 towards the passenger. The table 12 has an upper surface 19 which, when the table 12 is in its extended position as shown, projects generally horizontally from the seat back 11. The latter constitutes an integral part of the seat 10. A recess 20 is formed in the upper right-hand corner of the table surface 19 to locate the base of a glass or other drinking vessel, thereby inhibiting it from sliding off the table 12.

The features of the seat 10 described to this point are well-known. The invention provides a cover 21 for the table surface 19 and this is indicated generally in FIG. 1 by the dotted line. The dotted line showing 50 indicates indicia or information which can be provided on the upper face of the cover 21.

Figure 2:
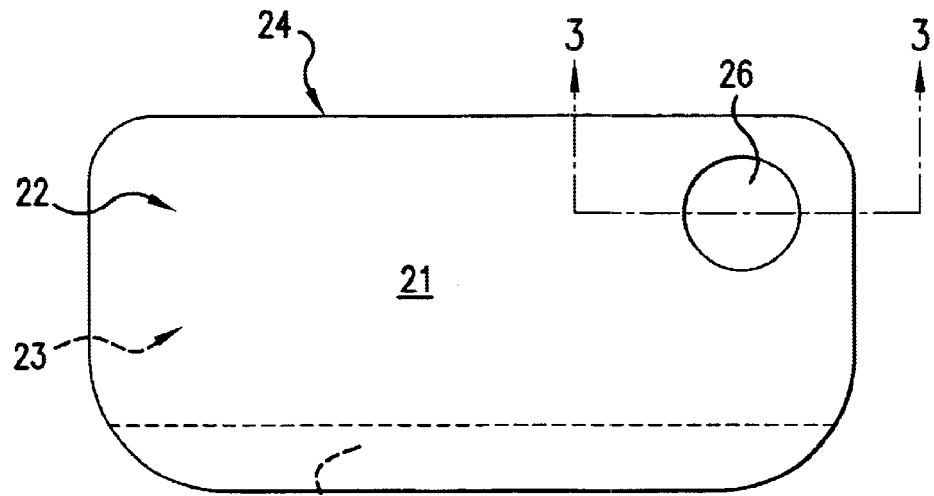
FIG. 2 is a plan view, to a larger scale, of one form of cover.
Figure 3:
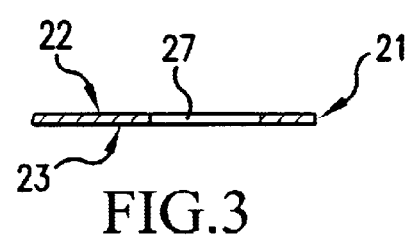
FIG. 3 is a scrap section on the line 3—3 in FIG. 2.

As shown in FIGS. 2 and 3, the cover 21 comprises a sheet of laminated material of which the upper face 22 will be visible to the passenger, and the lower face 23 will lie against, and be supported by, the table surface 19 whenever the table 12 is in its extended position. Although the periphery 24 of the cover can be shaped as desired to match, conform, or complement all, or part, of the table surface 19, it is preferred to round the corners as shown to avoid projections which could snag against the passenger's clothing, or against the fabric lining the recess 15 when the table is moved to its stowed position. The cover may desirably be slightly smaller than the plan profile of the table whereby no part of the fitted cover will project beyond the edge of the table. However, a small tab may be arranged to project beyond the edge of the table to facilitate removal of the cover. It will be noted that the corners nearest to the passenger have a greater radius of curvature. The material forming the laminate is fire-resistant and the upper face 22 is printed to achieve one or more of the features already described. The lower face 23 has a strip or layer 25 of adhesive material which would be protected by an unshown pull-strip before use. After the pull-strip has been removed, the cover is positioned over the table surface 19 and the adhesive layer is gently pressed against the table surface 19. By positioning the adhesive layer adjacent the second edge 18, the table 12 can be moved from its extended position to its stowed position without the cover 21 falling off. In the stowed position, the cover 21 is suspended from the second edge 18 of the table by its top edge which carries the adhesive strip 25. When the table 12 is returned to its extended position, the cover 21 is pulled downwards by its connection with the descending edge 18, the main body of the cover 21 remaining next to the table surface 19. In some cases it is possible that movement of the table 12 towards its stowed position could cause the unsecured portion of the cover 21 to move away from the table 12; in such cases an appropriate additional area of its lower surface 23 can be provided with an adhesive layer in the same way as strip 25. If desired, the entire lower surface 23 can be covered by adhesive which is protected prior to use by a removable backing sheet; in this case the cover may, for instance, be manufactured from a material such as that marketed under the Trade Mark FASSON which comprises an offset vinyl sheet having an adhesive layer that is protected prior to use by a tear-off backing sheet.

The cover 21 shown in FIG. 2 has a press-out portion 26 in the position that will, in use, overlie the recess 20 in the table surface 19. After the portion 26 has been pressed out, the cover is left with an aperture 27 as shown in FIG. 3 so that a drinking vessel can have its base inserted through the aperture 27 into the recess 20. The press-out portion 26 can also be provided with printed information and be of a size to be adhered, by a separate area of the adhesive, to the bottom of the recess 20.

Figure 4:
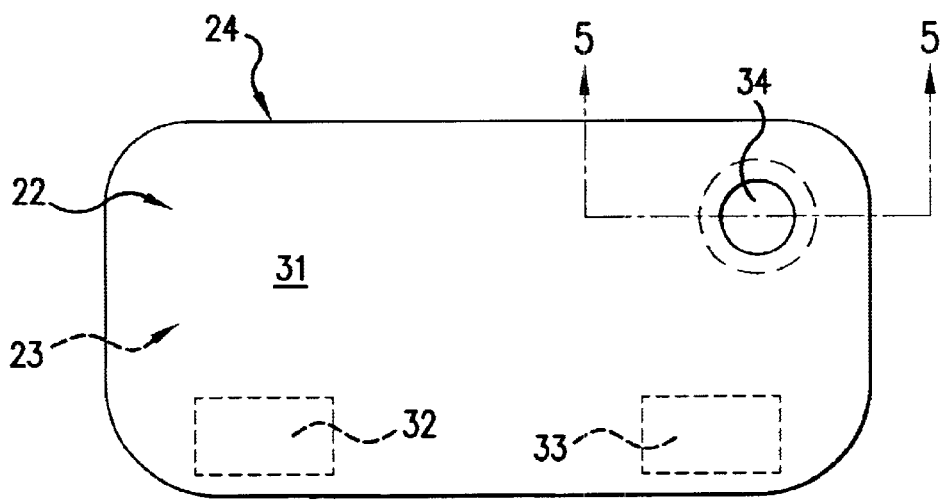
FIG. 4 is similar to FIG. 2 but illustrates another form of cover.
Figure 5:
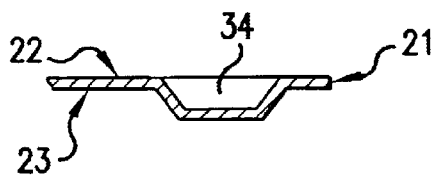
FIG. 5 is a scrap section on the line 5—5 in FIG. 4.

As the cover 31 illustrated in FIGS. 4 and 5 is generally similar to that already described with reference to FIGS. 2 and 3, the same reference numerals have been used to denote equivalent features and only the points of difference will be described. The adhesive strip 25 of FIG. 2 has been replaced by two smaller adhesive areas 32 and 33 which are positioned as before. Instead of the press-out portion 26, the cover has been moulded to define a frusto-conical indentation 34 to fit inside the recess 26. In this manner the base of a drinking vessel will fit inside the indentation 34. Also there is no need to press-out any portion 26, and the cover can be printed before the formation of the indentation so that the printing can extend over the indented area for viewing by the passenger.

Figure 6:
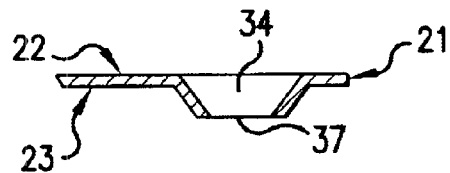
FIG. 6 is a view similar to FIG. 5 but illustrating a modification.

FIG. 6 shows a modification of the arrangement described with reference to FIG. 5. The modification comprises forming an aperture 37 through the base of the indentation 34 so that the drinking vessel will be supported directly by the recess 20 in the table surface 19. The aperture 37 leaves the frusto-conical surface of the indentation 34 to engage the sides of the recess 20 and can be formed either during the pressing of the indentation 34 or as a press-out as already described.

Figure 7:
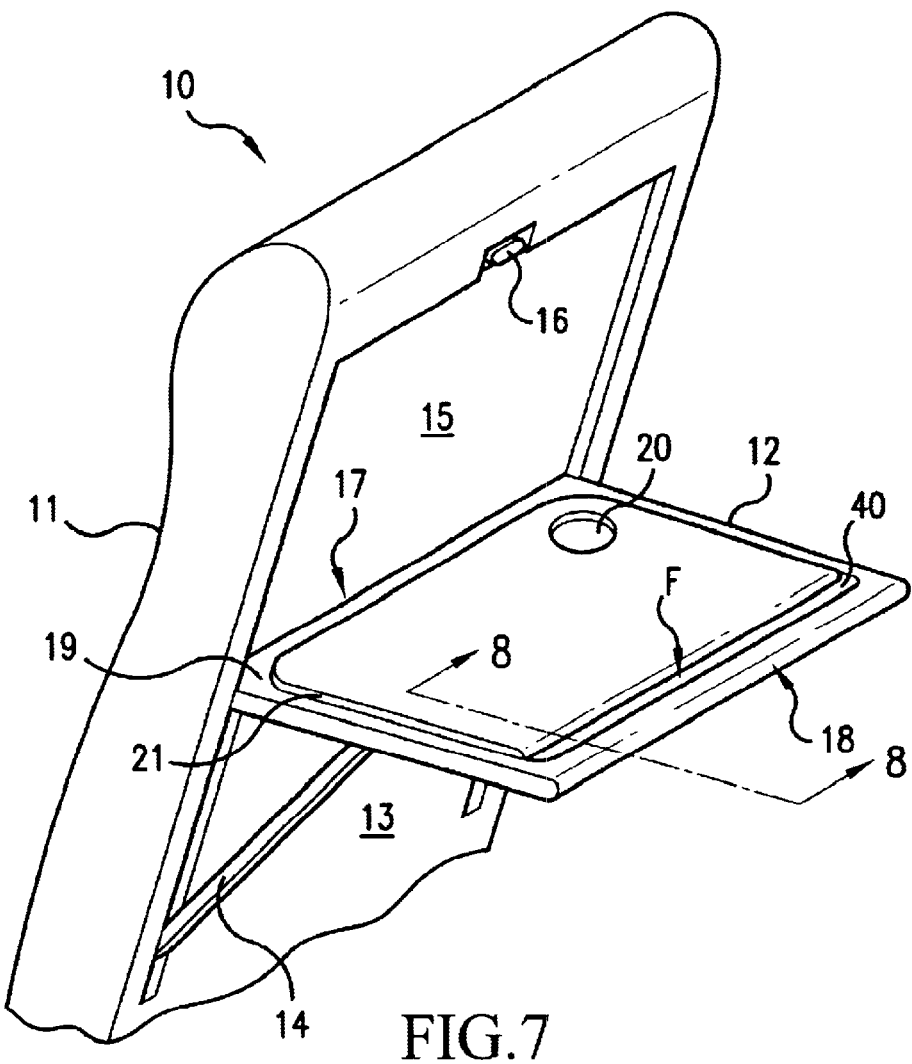
FIG. 7 is a view similar to FIG. 1 showing the cover secured to the table by a clip.
Figure 8:
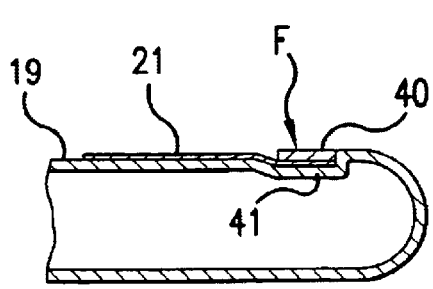
FIG. 8 is an enlarged section along the line 8—8 in FIG. 7.
Figure 9:
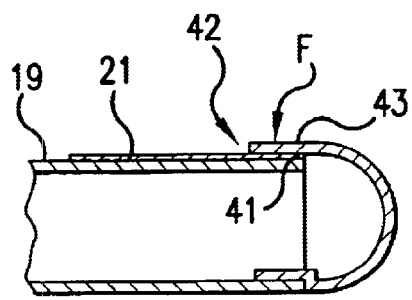
FIG. 9 is a view similar to FIG. 8 but showing an alternative form of clip means.

Instead of using an adhesive to secure the cover to the table, it may be secured in position by one or more clips. For instance, as shown in FIGS. 7 and 8 which use the same reference numerals as FIG. 1 to denote the same components, a clip means may be positioned adjacent the second edge 18 of the table 12 and, as illustrated may comprise a strip 40 which is carried by the table 12 and is positioned to extend substantially across the table 12. In this manner an edge 14 of the cover 21 adjacent the passenger is releasably trapped under the strip 40 by a bias force F. The clip means, that is the strip 40, forms part of the table 12 and can either be a built-in feature of new vehicle seats, or could be installed as a modification of an existing vehicle seat. Although the strip 40 could either be a dedicated separate component of the table, for instance a strip biased towards the surface of the table, or could be a structural component of the table. In the latter event the clip could be defined as a slot between two components of the table which are biased together so as to form the clip. The construction of such a clip or clips will depend on the table design and will be clear to any engineer in this art, the governing feature being that the clip should detachably secure the appropriate edge of the cover to the table.

It is to be understood that while certain embodiments have been described herein by way of examples, the invention is not to be limited to the specific structures described. In particular the invention can readily be applied to vehicle seats carrying tables articulated by other mechanisms, and the covers may be shaped to be compatible with the associated table design. Typically the covers will be shaped to conform with the table profile and will preferably be slightly smaller so that no part of the fitted cover will project beyond the edge of its table.

We claim:

1. A vehicle seat provided with an articulatable table, a mechanism supporting said table for articulation between an extended position in which a surface of said table is orientated to extend generally horizontally from said seat for use by a passenger and a stowed position in which said table surface is not horizontal, a cover comprising a sheet of a material selected from the group of materials consisting of fire-retardent and flame-proof materials, said cover being positioned over said table surface and having an upper face bearing information that will be visible to said passenger when said table is in said extended position, and releasable attachment means detachably securing said cover to said table whereby said table is moveable between said stowed position and said extended position without damaging said cover.

2. The vehicle seat, according to claim 1, in which said table is supported by said mechanism from a back portion of said seat whereby, in said extended position said table surface will extend backwards from said seat back portion with a first edge of said table surface directed towards said seat back portion and with a second edge of said table surface, parallel-spaced from said first edge, directed away from said seat back portion, in said stowed position said second edge will be positioned generally above said first edge, and said releasable attachment means is arranged to detachably secure said cover to said table at least adjacent to said second edge.

3. The vehicle seat, according to claim 2, in which said releasable attachment means is an adhesive layer carried by a lower face of said cover facing said table surface, and said adhesive layer is positioned adjacent an edge of said cover that is adjacent said second edge of said table.

4. The vehicle seat, according to claim 3, in which said adhesive layer is in the form of adhesive extending substantially across said lower face of said cover.

5. The vehicle seat, according to claim 3, in which said adhesive layer is also carried by at least one other area of said lower face necessary to keep said cover undamaged during articulation of said table.

6. The vehicle seat, according to claim 1, in which said releasable attachment means is an adhesive layer carried by a lower face of said cover facing said table surface.

7. The vehicle seat, according to claim 1, in which said releasable attachment means comprises a series of discrete areas of adhesive carried by and extending substantially across a lower face of said cover facing said table surface.

8. The vehicle seat, according to claim 1, in which said table defines a recess for locating a drinking vessel, and said cover is shaped to allow the drinking vessel to be located in said recess.

9. The vehicle seat, according to claim 8, in which said cover is formed with a portion that is distorted into said depression.

10. The vehicle seat, according to claim 9, in which said distorted portion is connected to said cover by an array of spiral strips.

11. The vehicle seat, according to claim 8, in which said cover is formed with an aperture that overlies said recess.

12. The vehicle seat, according to claim 11, in which said aperture is formed by a press-out portion of said cover, and the press-out portion is detachably secured in said recess.

13. The vehicle seat, according to claim 8, in which said cover is formed with a portion that fits into said depression.

14. A vehicle seat provided with:
an articulatable table;
a mechanism supporting said table for articulation between an extended position in which a surface of said table is orientated to extend generally horizontally from said seat for use by a passenger and a stowed position in which said table surface is not horizontal;
a cover comprising a sheet of a material selected from the group of materials consisting of fire-retardent and flame-proof materials, said cover being positioned over said table surface and having an upper face bearing information that will be visible to said passenger when said table is in said extended position;
releasable attachment means detachably securing said cover to said table whereby said table is moveable between said stowed position and said extended position without damaging said cover;
wherein said table is supported by said mechanism from a back portion of said seat whereby, in said extended position said table surface will extend backwards from said seat back portion with a first edge of said table surface directed towards said seat back portion and with a second edge of said table surface, parallel-spaced from said first edge, directed away from said seat back portion, in said stowed position said second edge will be positioned generally above said first edge;
wherein said releasable attachment means is arranged to detachably secure said cover to said table at least adjacent said second edge; and
wherein said releasable attachment means is a releasable clip means carried by said table.

15. The vehicle seat, according to claim 14, in which said releasable clip means is arranged adjacent said second edge of said table.

16. The vehicle seat, according to claim 15, in which said releasable clip means includes a strip that is carried by said table and extends substantially across said table next to said second edge, and said cover has its edge releasable trapped under said strip.

17. A table cover, for use with a table supported by a vehicle seat for articulation between a stowed position and an extended position in which said table extends generally horizontally from said seat for use by a passenger, comprising a sheet of material selected from the group of materials consisting of fire-retardent and fire-resistant materials, said sheet of material being shaped to conform with the profile of said table, said sheet of material having an upper face bearing information that will be visible to the passenger when said sheet of material is carried by said table and said table is in said extended position, said sheet of material having a lower face that will be supported by said table when said table is in said extended position, and an adhesive layer carried by said lower face to enable said cover to be releasably secured to said table.

18. The cover, according to claim 17, having a removable protective sheet detachably adhered to said adhesive area for removal before said cover is secured to said table.

19. The cover, according to claim 17, formed with a press-out portion in a position that will, after being pressed-out, define an aperture that will register with a recess in said table for locating a drinking vessel.

20. The cover, according to claim 17, having a portion that can be distorted into a depression in said table for locating a drinking vessel.

21. The cover, according to claim 20, in which said distorted portion is connected to said cover by an integral array of spiral strips.

22. The cover, according to claim 17, having a portion deformed from the plane of said sheet of material and shaped to fit into a depression in said table for locating a drinking vessel.

23. The cover, according to claim 17, which is formed as a lamination of a plurality of layers including said sheet of material.

24. The table cover, according to claim 23, in which said lamination includes a picture which extends over said upper face and is protected by a transparent sealing layer.

25. The table cover of claim 17, further comprising a plurality of covers that includes the sheet of material such that the plurality of covers are interconnected along a common edge so that, when a lowermost cover of the plurality of covers is secured to said table, each of the covers can be selectively exposed for viewing by a passenger.

26. The table cover, according to claim 17, which is shaped to be slightly smaller than the plan profile of said table surface to ensure that substantially no part of said cover will, in use, extend beyond the periphery of said table.

27. The table cover, according to claim 26, which includes a tab which will, in use, extend beyond said periphery of said table to facilitate subsequent removal of said cover from said table surface.

28. The table cover, according to claim 17, having rounded corners to avoid snagging against the clothing of a passenger or a fabric covering of said seat.

29. The table cover, according to claim 17, defining an aperture in a position that will, in use, register with a recess in said table surface.

30. A vehicle seat provided with:

an articulatable table;

a mechanism supporting said table for articulation between an extended position in which a surface of said table is orientated to extend generally horizontally from said seat for use by a passenger and a stowed position in which said table surface is not horizontal;

a cover comprising a sheet of a material selected from the group of materials consisting of fire-retardant and flame-proof materials, said cover being positioned over said table surface and having an upper face bearing information that will be visible to said passenger when said table is in said extended position;

releasable attachment means detachably securing said cover to said table whereby said table is moveable between said stowed position and said extended position without damaging said cover;

wherein said table is supported by said mechanism from a back portion of said seat whereby, in said extended position said table surface will extend backwards from said seat back portion with a first edge of said table surface directed towards said seat back portion and with a second edge of said table surface, parallel-spaced from said first edge, directed away from said seat back portion, in said stowed position said second edge will be positioned generally above said first edge;

wherein said releasable attachment means is arranged to detachably secure said cover to said table at least adjacent said second edge;

wherein said releasable attachment means is a releasable clip means including a strip that is carried by said table and extends substantially across said table next to said second edge of said table; and wherein said cover has an edge releasably trapped under said strip.

31. A vehicle seat provided with:

an articulatable table;

a mechanism supporting said table for articulation between an extended position in which a surface of said table is orientated to extend generally horizontally from said seat for use by a passenger and a stowed position in which said table surface is not horizontal;

a cover comprising a sheet of a material selected from the group of materials consisting of fire-retardant and flame-proof materials, said cover being positioned over said table surface and having an upper face bearing information that will be visible to said passenger when said table is in said extended position, and releasable attachment means detachably securing said cover to said table whereby said table is moveable between said stowed position and said extended position without damaging said cover;

wherein said table is supported by said mechanism from a back portion of said seat whereby, in said extended position said table surface will extend backwards from said seat back portion with a first edge of said table surface directed towards said seat back portion and with a second edge of said table surface, parallel-spaced from said first edge, directed away from said seat back portion, in said stowed position said second edge will be positioned generally above said first edge;

wherein said releasable attachment means is arranged to detachably secure said cover to said table at least adjacent said second edge;

wherein said releasable attachment means is a releasable clip means comprising a slot defined between two components of said table that are biased towards each other, said slot being positioned adjacent said second edge of said table; and wherein said cover has an edge releasably trapped in said slot.

* * * * *